United States Patent [19]

Yamashita

[11] Patent Number: 5,046,062
[45] Date of Patent: Sep. 3, 1991

[54] MOVABLE BODY DRIVING APPARATUS

[75] Inventor: Hiroshi Yamashita, Kawasaki, Japan

[73] Assignee: Kabushiki Kaisha Toshiba, Kanagawa, Japan

[21] Appl. No.: 265,169

[22] Filed: Oct. 28, 1988

[30] Foreign Application Priority Data

Oct. 31, 1987 [JP] Japan .................. 62-274646

[51] Int. Cl.⁵ .............................. B25B 1/06
[52] U.S. Cl. .................. 369/219; 369/215; 369/249; 369/255
[58] Field of Search ............... 369/244, 249, 251, 254, 369/255, 256, 43, 44.11, 215, 219; 360/101, 104, 105, 106, 107

[56] References Cited

U.S. PATENT DOCUMENTS

| 4,418,371 | 11/1983 | Menden | 360/106 |
| 4,554,653 | 11/1985 | Malissin et al. | 369/44.16 |
| 4,570,249 | 2/1986 | Malissin et al. | 369/44.22 |
| 4,812,934 | 3/1989 | Suzuki et al. | 360/104 X |
| 4,823,336 | 4/1989 | Inada et al. | 360/106 X |
| 4,831,480 | 5/1989 | Takeda | 360/106 |
| 4,943,166 | 7/1990 | Yamishita | 369/32 |

OTHER PUBLICATIONS

*IBM Technical Disclosure Bulletin* vol. 18 No. 7 "Drive Band Read/Write Head Attachment" E. L. Bailey; pp. 2244-2245 12/1975.

*Primary Examiner*—Benjamin R. Fuller
*Assistant Examiner*—Randy W. Gibson
*Attorney, Agent, or Firm*—Finnegan, Henderson, Farabow, Garrett, and Dunner

[57] ABSTRACT

An optical head driving apparatus is constructed to move an optical head along the radius of an information storage medium which is rotating, to face the optical head to a predetermined position of the information storage medium where the optical head carries out a predetermined information process with respect to the information storage medium. The optical head driving apparatus comprises at least one circular bearing and at least one elliptic bearing. The bearings are disposed on opposite sides of a center of gravity of the optical head, respectively. A first guide shaft extends to pass through the circular bearing while a second guide shaft extends to pass through the elliptic bearing. The bearings and the first and second guide shafts constitute a guide means to movably support the optical head. The optical head driving apparatus further comprises an optical head moving means for controlling the movement of the optical head. A moving portion of the optical head moving means is connected to the optical head such that a center of gravity of the moving portion of the optical head moving means is positioned substantially under the first guide shaft.

6 Claims, 4 Drawing Sheets

MOVABLE BODY DRIVING APPARATUS

BACKGROUND OF THE INVENTION

1. The present invention relates to a movable body driving apparatus in an information processing unit such as an optical head driving apparatus in an optical disk unit.

2. Description of the Related Art

Compared to a magnetic information processing unit, an optical disk information processing unit has advantages that its information storage capacity is remarkably large, that its noise is small, that it is almost not influenced by external factors, that its data storage state is remarkably stable and that it can process information under a non-contacting state to remarkably reduce damages to be caused on its information storage medium and head. Due to these advantages, the optical disk information processing units are widely used in recent years. An example of the optical disk information processing unit is disclosed, for instance, in the U.S. Pat. No. 4,513,406.

In such an information processing unit, an optical head driving apparatus controls the movement of an optical head such that the optical head moves along the radius of an optical disk to carry out information processing operation with respect to the optical disk. The optical head driving apparatus usually comprises a circular bearing whose bearing surface has a circular cross section and an elliptic bearing whose bearing surface has an elliptic cross section. The circular bearing is disposed on one side of a center of gravity of the optical head while the elliptic bearing is disposed on the other side of the center of gravity of the optical head. A first guide shaft passes through the circular bearing, and a second guide shaft passes through the elliptic bearing. The bearings and the first and second guide shafts constitute a guide means of the optical head.

The movement of the optical head is controlled by a linear motor which has a bobbin as a moving portion of the linear motor. A driving coil is wound around the bobbin. The bobbin is positioned symmetrically with respect to the center of gravity of the optical head with the first guide shaft as an axis of symmetry, and the bobbin is connected to the optical head via a proper member to control the movement of the optical head.

As described in the above, in the optical head driving apparatus according to the prior art, the bobbin of the linear motor is positioned symmetrically with respect to the center of gravity of the optical head with the first guide shaft as an axis of symmetry and connected to the optical head. Therefore, a couple of forces are generated at a thrust acting point of the linear motor and the center of gravity of the optical head to generate torsional and abrasive forces between the bearings and the guide shafts. Due to this, service lives of the bearings will be shortened. In addition, balance between a load applied to the circular bearing and a load applied to the elliptic bearing may be lost such that the load on the elliptic bearing is excessively reduced to vibrate a driving system. Due to this, a driving action may not be stable.

SUMMARY OF THE INVENTION

An object of the present invention is to provide a movable body driving apparatus such as an optical head driving apparatus which can prevent torsional and abrasive forces from occurring between bearings and guide shafts to improve service lives of the bearings, etc., balance loads applied to the respective bearings with each other to prevent a driving system from vibrating and always provide a stable driving action.

In order to accomplish the object, the present invention provides an optical head driving apparatus for moving an optical head along the radius of an information storage medium which is rotating, to face the optical head to a predetermined position of the information storage medium where the optical head carries out a predetermined information process with respect to the information storage medium. The optical head driving apparatus of the present invention comprises at least one circular bearing and at least one elliptic bearing. The bearings are provided for the optical head and disposed on opposite sides of a center of gravity of the optical head, respectively. A first guide shaft extends to pass through the circular bearing while a second guide shaft extends to pass through the elliptic bearing. The bearings and the first and second guide shafts constitute a guide means to movably support the optical head. The optical head driving apparatus further comprises an optical head moving means for controlling the movement of the optical head. A moving portion of the optical head moving means is connected to the optical head such that a center of gravity of the moving portion of the optical head moving means is positioned substantially under the first guide shaft.

DETAILED DESCRIPTION OF THE PREFERRED EMBODIMENTS

An embodiment of the present invention will be explained with reference to FIGS. 1 to 5.

Figure 1:
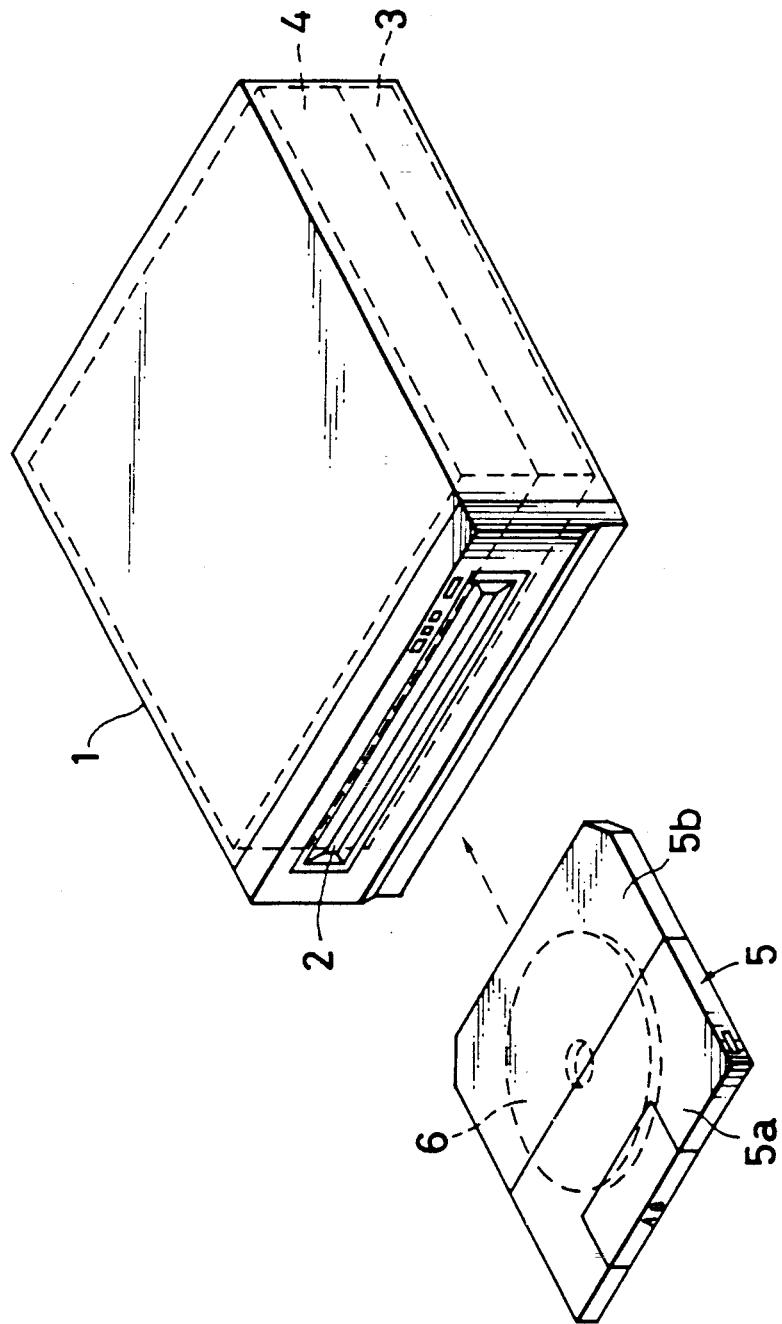
FIG. 1 is a perspective view showing an information processing unit provided with an optical head driving apparatus according to an embodiment of the present invention.

Firstly, an information processing unit and an information storing cartridge (hereinafter called the cartridge) will be explained with reference to FIG. 1.

In the figure, an information processing unit 1 has an opening 2 formed at the upper part of a front panel of the information processing unit 1 and through which a cartridge 5 is inserted into and removed from the information processing unit 1. In the information processing unit 1, there are disposed a drive base mechanism 3 which is an information processing mechanism, a loading mechanism 4 for receiving and loading a medium and control devices (not shown) for driving the above-mentioned mechanisms.

The cartridge 5 accommodates an optical disk 6 which is the information storage medium. The optical disk 6 as received in the cartridge 5 is inserted into the information processing unit 1 and automatically loaded to a predetermined position horizontally by the loading mechanism 4. At this time, cases 5a and 5b of the cartridge 5 are opened to expose a central rotary portion of the optical disk 6. After that, the cartridge 5 is shifted orthogonal to an insertion direction, i.e., in a direction such that the optical disk 6 is mounted on a turn table (not shown) of the drive base mechanism 3.

Figure 2:
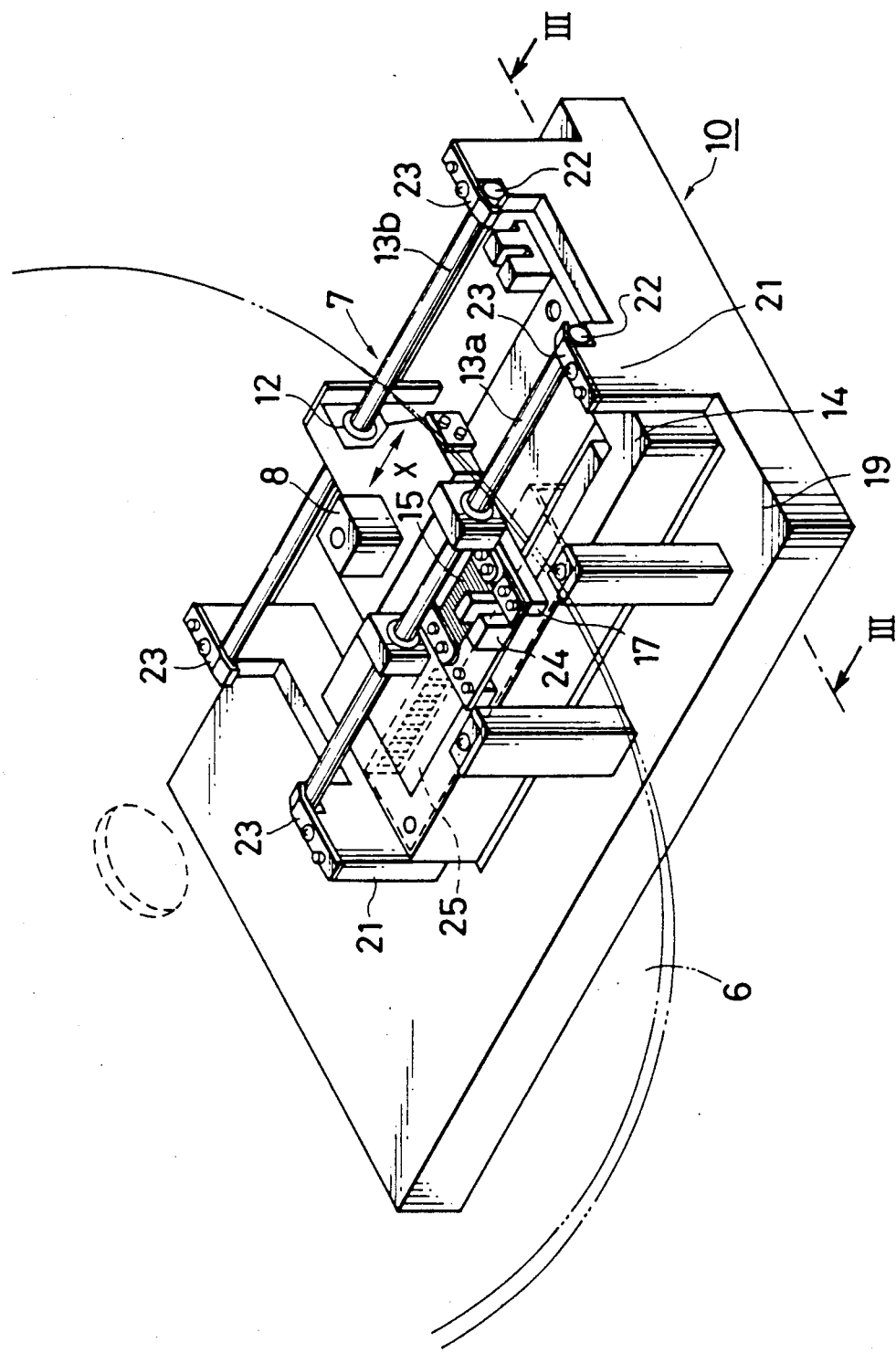
FIG. 2 is a perspective view showing the optical head driving apparatus.
Figure 3:
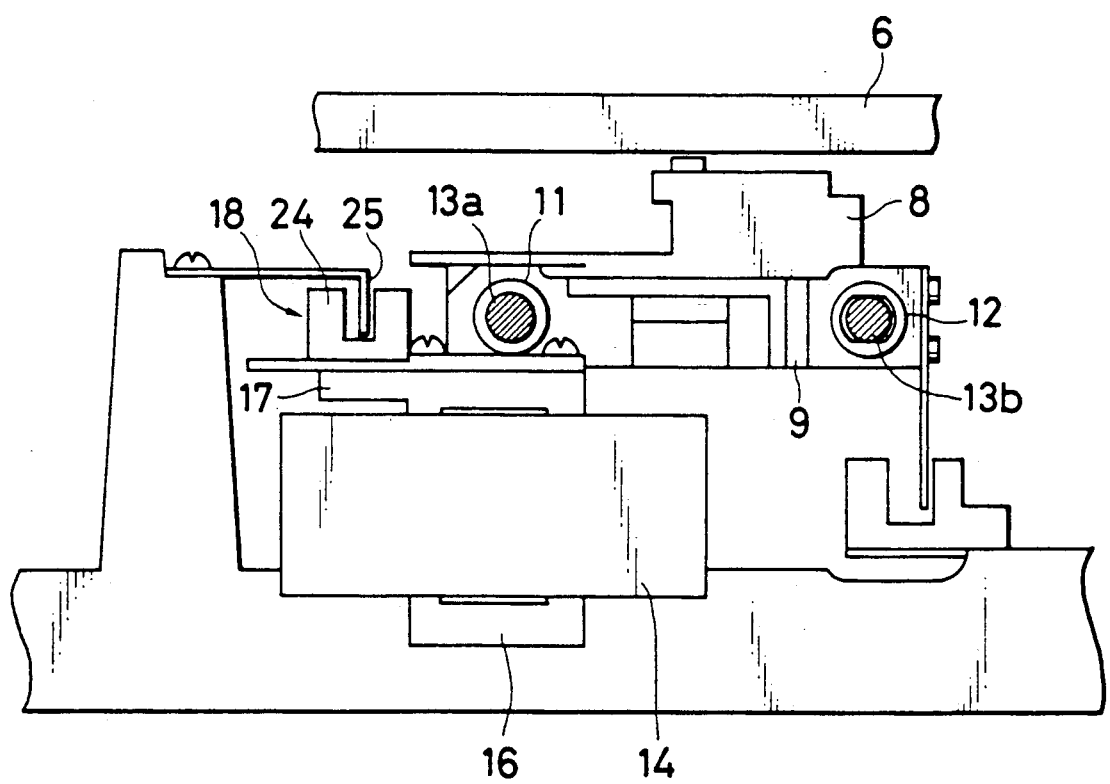
FIG. 3 is a sectional view taken along a line III—III of FIG. 2.
Figure 4:
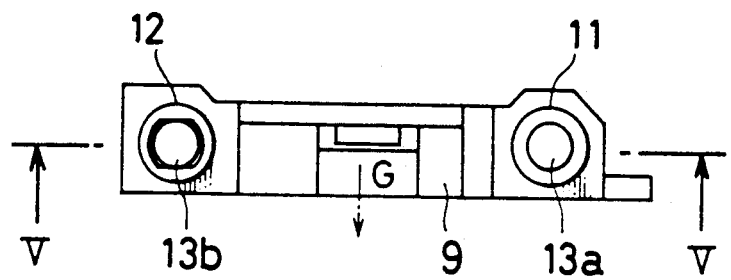
FIG. 4 is a front view of an optical head base.
Figure 5:
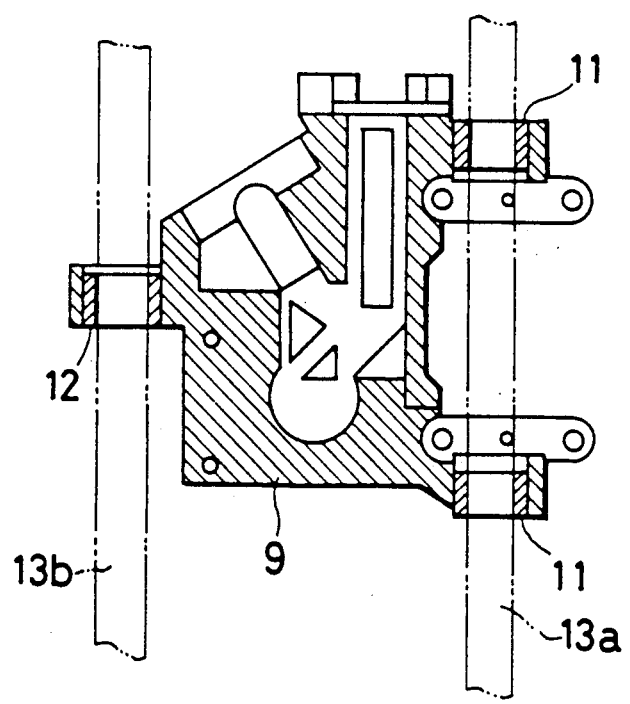
FIG. 5 is a sectional view taken along a line V—V of FIG. 4.

The drive base mechanism 3 has, in addition to a medium driving means provided with the above-mentioned turn table, an optical head driving apparatus 10 (FIG. 2). The optical head driving apparatus 10 moves an optical head 8 (FIG. 2) along the radius of the optical disk 6 to face the optical head 8 to a predetermined position, i.e., a predetermined recording track formed on a recording film coated over the optical disk 6. At this position, the optical head 8 carries out information processing operations such as information writing and reading operations with respect to the recording film.

The optical head driving apparatus 10 will be explained with reference to FIGS. 2 to 5.

The optical head driving apparatus 10 basically comprises the optical head 8 which is moved back and forth along the radius of the optical disk 6 by a guide means 7, a linear motor 14 which is an optical head moving means for moving the optical head 8 to face the optical head 8 to a predetermined position on the recording film of the optical disk 6, and a position detecting means 18 for detecting a position of the optical head 8 to be moved by the linear motor 14.

The optical head 8 is fitted to an optical head base 9. On the optical head base 9, there are disposed two oil containing bearings 11 each having a bearing surface of circular cross section (hereinafter called the circular bearings 11) and an oil containing bearing 12 having a bearing surface of elliptic cross section (hereinafter called the elliptic bearing 12). The circular bearings 11 are disposed on one side of a center of gravity G of the optical head base 9 and optical head 8 while the elliptic bearing 12 is disposed on the other side of the center of gravity G.

On a base 19, holding means 21 are arranged. The holding means 21 are spaced apart from each other and fixed at both ends of the moving direction of the optical head 8, respectively. Between the holding means 21, first and second guide shafts 13a and 13b extend. Both ends of the first and second guide shafts 13a and 13b are fitted to L-shaped grooves 22 formed at upper ends of the holding means 21 and pressed and fixed by plate springs 23 screwed to the holding means 21.

The first guide shaft 13a extends to pass through the two circular bearings 11, and the second guide shaft 13b extends to pass through the elliptic bearing 12. The bearings 11 and 12 and the first and second guide shafts 13a and 13b form the guide means 7. The optical head 8 on the optical head base 9 is supported at three points by the bearings 11, 11 and 12 and movable back and forth along the first and second guide shafts 13a and 13b.

The linear motor 14 has a bobbin 16 around which a driving coil 15 is wound. The bobbin 16 is a moving portion of the linear motor 14. An upper portion of the bobbin 16 is connected to an arm portion 17. The arm portion 17 is connected to a lower surface of the optical head base 9 such that a center of the bobbin 16 is positioned just under or slightly outside the first guide shaft 13a.

When a driving current flows through the driving coil 15, the optical head 8 is driven by the linear motor 14 to move in the direction of an arrow mark X of FIG. 2, i.e., along the radius of the optical disk 6.

The position detecting means 18 comprises a composite photointerruptor 24 which is fitted to the arm portion 17 of the linear motor 14 and incorporates a plurality of photointerruptors, and a scale 25 which is disposed in a moving path of the composite photointerruptor 24 and has many slits.

In the optical head driving apparatus 10 with the above-mentioned arrangement, the center of gravity G of the optical head 8 excluding the bobbin 16 of the linear motor 14 is positioned nearly in the middle of the first and second guide shafts 13a and 13b so that each of the three bearings 11, 11 and 12 may support one third of the weight of the optical head 8. Therefore, a driving system will not vibrate to realize a stable driving action.

Each of the circular bearings 11 achieves planar contact with respect to the first guide shaft 13a through its bearing surface of circular cross section. Therefore, an allowable load of each circular bearing 11 is large. On the other hand, the elliptic bearing 12 achieves linear contact with respect to the second guide shaft 13b through its bearing surface of elliptic cross section. Therefore, an allowable load of the elliptic bearing 12 is small. However, the center of the bobbin 16 is positioned substantially under the first guide shaft 13a which is supporting the two circular bearings 11 so that the weight of the bobbin 16 is substantially borne by the circular bearings 11 each having the large allowable load. Therefore, the elliptic bearing 12 whose allowable load is small is not subjected to large load so that its service life may be extended.

As mentioned in the above, the center of the bobbin 16 which is the moving portion of the linear motor 14 is substantially under the first guide shaft 13a so position that a thrust acting point of the bobbin 16 is in the vicinity of the center of gravity G of the optical head 8. As a result, a couple of forces generated at the thrust acting point and the center of gravity G may be small, and, therefore, almost no excessive torsional and abrasive forces are generated between the circular bearings 11 and the first guide shaft 13a. Accordingly, abrasion of the bearings, etc., will not occur excessively, thus extending their service lives and maintaining a good working condition of the apparatus for a long time.

In summary, according to the present invention, an optical head moving means is connected to an optical head such that a center of gravity of the optical head moving means is positioned substantially under a first guide shaft. Therefore, a thrust acting point of the optical head moving means is positioned close to a center of gravity of the optical head to reduce a couple of forces generated at the thrust acting point and the gravity of the optical head. As a result, torsional and abrasive forces will not be generated between bearings and the guide shaft so that abrasion of the bearings may be reduced to extend their service lives. In addition, loads applied to circular bearings and elliptic bearing are balanced with each other to prevent a driving system from vibrating, thereby providing a stable driving action at all times.

The present invention is not limited by the above-mentioned embodiment but many modifications may be made without departing from the spirit of the present invention.

What is claimed is:

1. An assembly for driving an optical head along a path of movement aligned with a radial direction of an optical disc, comprising:
    first and second spaced guide shafts, arranged generally parallel to one another, extending in the radial direction and defining the path of movement;
    slide means extending between said first and second guide shafts for sliding the optical head along said first and second guide shafts in the path of movement, including mounting means for mounting the optical head to said slide means with a center of gravity of the optical head intermediate said first and second guide shafts, and first and second bearing means for slidably connecting the slide means to each of said first and second guide shafts, said first bearing means including two spaced bearing portions cooperating with said first guide shaft, and said second bearing means including a single bearing portion cooperating with said second guide shaft; and drive means for driving said slide means along said first and second guide shafts in the path of movement, mounted to said slide means with a center of gravity of said drive means positioned substantially beneath said first guide shaft.

2. The assembly of claim 1, wherein said two bearing portions of said first bearing means are substantially circular in cross-section.

3. The assembly of claim 1, wherein said single bearing portion of said second bearing means is substantially elliptic in cross-section.

4. An assembly for driving an optical head along a path of movement aligned with a radial direction of an optical disc, comprising:

first and second spaced guide shafts arranged generally parallel to one another, extending in the radial direction and defining the path of movement;

slide means having first and second extending between said first and second guide shafts for sliding the optical head along said first and second guide shafts in the path of movement, including mounting means for mounting the optical head to said slide means with a center of gravity of the optical head intermediate said first and second guide shafts, and first and second bearing means for slidably connecting the slide means to each of said first and second guide shafts, said first bearing means including two spaced bearing portions, being generally circular in cross-section, slidably connecting said first end of said slide means to said first guide shaft at two spaced points of cooperation, said second bearing means including a single bearing portion, being generally elliptic in cross-section, slidably connecting said second end of said slide means to said second guide shaft at a single point of cooperation; and drive means for driving said slide means along said first and second guide shafts in the path of movement, mounted to said slide means with a center of gravity of said drive means positioned substantially beneath said first guide shaft.

5. The assembly of claim 4, wherein said two bearing portions of said first bearing means are configured to support a load greater than a load supported by said single bearing portion of said second bearing means.

6. The assembly of claim 4, wherein a weight of said drive means is supported by said two bearing portions of said first bearing means.

* * * * *

UNITED STATES PATENT AND TRADEMARK OFFICE
CERTIFICATE OF CORRECTION

PATENT NO. : 5,046,062
DATED : September 03, 1991
INVENTOR(S) : Hiroshi Yamashita It is certified that error appears in the above-identified patent and that said Letters Patent is hereby corrected as shown below:

Claim 4, column 5, line 30, after "second" insert --ends--.

Signed and Sealed this

Sixth Day of April, 1993

Attest:

STEPHEN G. KUNIN

Attesting Officer

Acting Commissioner of Patents and Trademarks